(12) United States Patent
Kim

(10) Patent No.: US 8,744,068 B2
(45) Date of Patent: Jun. 3, 2014

(54) MEASURING QUALITY OF EXPERIENCE IN TELECOMMUNICATION SYSTEM

(75) Inventor: Seungil Kim, Seoul (KR)

(73) Assignee: Empire Technology Development LLC, Wilmington, DE (US)

( * ) Notice: Subject to any disclaimer, the term of this patent is extended or adjusted under 35 U.S.C. 154(b) by 264 days.

(21) Appl. No.: 13/143,521

(22) PCT Filed: Jan. 31, 2011

(86) PCT No.: PCT/US2011/023209
§ 371 (c)(1),
(2), (4) Date: Jul. 6, 2011

(87) PCT Pub. No.: WO2012/105941
PCT Pub. Date: Aug. 9, 2012

(65) Prior Publication Data
US 2012/0195424 A1  Aug. 2, 2012

(51) Int. Cl.
*H04M 1/00* (2006.01)
*H04B 1/38* (2006.01)
*H04W 72/00* (2009.01)

(52) U.S. Cl.
USPC .............. 379/392.01; 455/570; 455/452.2

(58) Field of Classification Search
None
See application file for complete search history.

(56) References Cited

U.S. PATENT DOCUMENTS

| | | | |
|---|---|---|---|
| 6,154,721 A * | 11/2000 | Sonnic | 704/233 |
| 6,434,110 B1 * | 8/2002 | Hemkumar | 370/201 |
| 6,792,107 B2 | 9/2004 | Tucker et al. | |
| 7,536,006 B2 | 5/2009 | Patel et al. | |
| 7,729,275 B2 | 6/2010 | El-Hennawey et al. | |
| 2002/0057791 A1 | 5/2002 | Piket et al. | |
| 2006/0217973 A1 * | 9/2006 | Gao et al. | 704/221 |
| 2007/0121925 A1 | 5/2007 | Cruz-Zeno et al. | |
| 2007/0265840 A1 * | 11/2007 | Matsubara et al. | 704/205 |
| 2009/0028355 A1 * | 1/2009 | Ishiguro | 381/66 |
| 2010/0063809 A1 | 3/2010 | Trump | |

OTHER PUBLICATIONS

Acoustic Echo Canceller from Wikipedia—http://en.wikipedia.org/wiki/Echo_cancellation, downloaded, Jul. 1, 2011.
Critical Steps for Successful VoIP Deployment—http://www.broadcom.com/collateral/wp/VOIP-WP101-R.pdf, Apr. 25, 2005.

* cited by examiner

*Primary Examiner* — Fan Tsang
*Assistant Examiner* — Jeffrey Lytle
(74) *Attorney, Agent, or Firm* — Maschoff Brennan

(57) ABSTRACT

Technologies are generally described for a system for measuring a quality of experience (QoE). In some examples, a quality of experience (QoE) measuring device may include a background noise detecting unit configured to measure a background noise around a near-end talker, and a decision unit configured to determine whether a double talk event detected by a double talk detector is caused by the background noise around the near-end talker.

27 Claims, 3 Drawing Sheets

MEASURING QUALITY OF EXPERIENCE IN TELECOMMUNICATION SYSTEM

BACKGROUND

It is known that voice discontinuity during a phone call is generally due to network channel problems such as packet loss or delay. However, the voice discontinuity can also be observed in the far-end talker (FET) signal when the near-end talker (NET) is surrounded by noisy environment.

Typically, an acoustic echo canceler (AEC) employed in a telecommunication system includes an adaptive filter. When a double talk event between a near-end talker and a far-end talker is detected by a double talk detector in the telecommunication system, the double talk detector usually freezes the adaptive filter in order to update no more signals in the double talk event. Since most of the AEC-equipped products are designed to substantially support half-duplex operating mode, voice discontinuity occurs when a double talk event is detected. In noisy environment, a double talk event can be caused by a background noise around a near-end talker, even in case where the near-end talker does not speak, which induces a voice discontinuity. In such cases, the voice discontinuity is more of the problems caused by background noise of nearby environment rather than the network channel problems.

To evaluate sound quality of a telecommunication system, it is necessary to identify the quality degradation due to ambient background noise and distinguish it from the quality degradation due to network channel. Also, the objective quality of experience (QoE) measure is necessary to evaluate the sound quality of the background noise environment.

SUMMARY

In an example, a quality of experience (QoE) measuring device may include a background noise detecting unit configured to measure a background noise around a near-end talker, and a decision unit configured to determine whether a double talk event detected by a double talk detector is caused by the background noise around the near-end talker. The double talk detector may detect the double talk event between the near-end talker and a far-end talker.

In an example, a telecommunication terminal may include a double talk detector configured to detect a double talk event between the telecommunication terminal and the other party of a call, a background noise detecting unit configured to measure a background noise around the telecommunication terminal, and a decision unit configured to determine whether the double talk event detected by the double talk detector is caused by the background noise around the telecommunication terminal.

In an example, a method performed under control of a quality of experience (QoE) measuring device may include measuring a background noise around a near-end talker, and determining whether a double talk event between the near-end talker and a far-end talker is caused by the background noise around the near-end talker.

In an example, a computer-readable storage medium whose contents, when executed by a processor, cause the processor to measure a background noise around a near-end talker, and determine whether a double talk event between the near-end talker and a far-end talker is caused by the background noise around the near-end talker.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
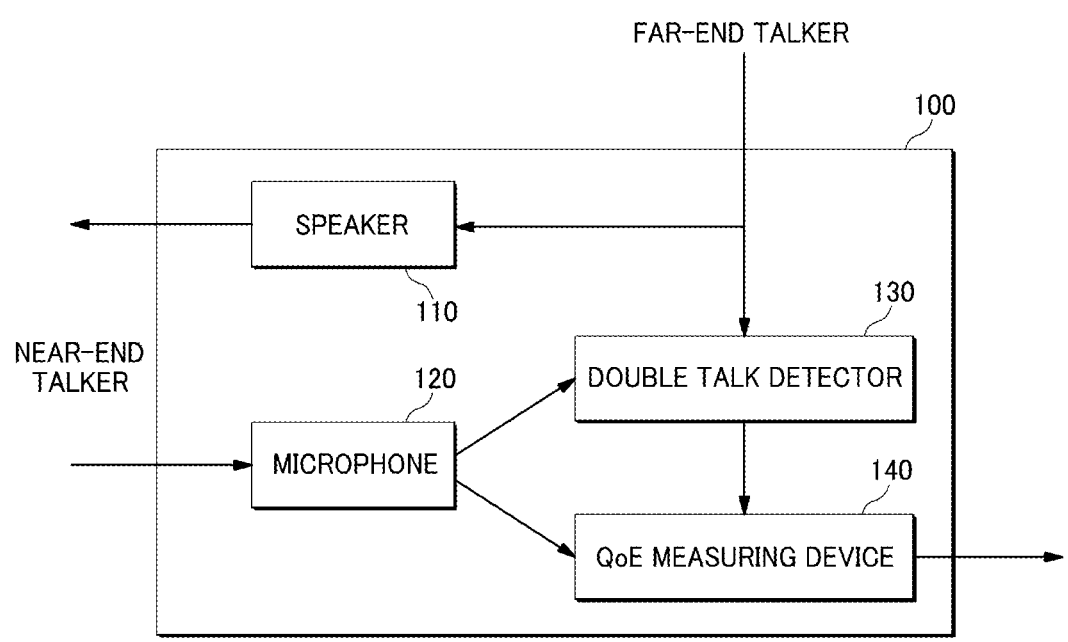
FIG. 1 shows a schematic block diagram of an illustrative example of a telecommunication terminal.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to a quality of experience of a telecommunication system.

Briefly stated, technologies are generally described for a device for measuring a quality of experience of a telecommunication system. In some examples, the device includes a background noise detecting unit to measure a background noise around a near-end talker. In some examples, the device includes a decision unit to determine whether a double talk event detected by a double talk detector is caused by the background noise around the near-end talker.

FIG. 1 shows a schematic block diagram of an illustrative example of a telecommunication terminal in accordance with at least some embodiments described herein.

Referring to FIG. 1, a telecommunication terminal 100 may include a speaker 110. Speaker 110 may output an audible signal originated from the other party of a call, i.e., a far-end talker. Speaker 110 may include, but not limited to, a speaker embedded in the terminal, a headphone speaker operably connected to the terminal, or an earphone speaker operably connected to the terminal.

Telecommunication terminal 100 may further include a microphone 120. Microphone 120 may detect a sound from an ambient environment around microphone 120. By way of example, but not limitation, microphone 120 may receive a voice signal from a user of telecommunication terminal 100, i.e., a near-end talker. Microphone 120 may also receive a background noise signal around the near-end talker.

Telecommunication terminal 100 may further include a double talk detector 130. Double talk detector 130 may receive the signal output from microphone 120 and the signal originated from the far-end talker, and detect a double talk event between the near-end talker and the far-end talker. Double talk detector 130 may detect the double talk event when the signal from microphone 120 exists and temporally overlaps the signal from the far-end talker. Since the signal output from microphone 120 may include the voice signal of the near-end talker and/or the background noise signal around the near-end talker as discussed above, the double talk event detected by double talk detector 130 may be caused by the near-end talker's speech and/or the background noise. That is, it is possible for double talk detector 130 to detect a double talk event due to the background noise, even in case where the near-end talker does not speak.

Telecommunication terminal 100 may further include a quality of experience (QoE) measuring device 140. QoE measuring device 140 may receive the signal output from microphone 120 and the signal output from double talk detector 130 and identify a double talk event caused by the background noise around the near-end talker. By way of example, but not limitation, QoE measuring device 140 may measure the background noise around the near-end talker, and determine whether the double talk event detected by double talk detector 130 is caused by the background noise. By way of example, but not limitation, QoE measuring device 140 may measure the average level of the background noise during a predetermined time interval, and compare the average level of the background noise with a predetermined value. In some embodiments, the predetermined time interval for measuring the average level of the background noise may be one frame. In other embodiments, the predetermined time interval for measuring the average level of the background noise may be 20 ms or 160 samples at frequency of 8 kHz. By way of example, but not limitation, if the average level of the background noise is higher than the predetermined value, QoE measuring device 140 may determine that the double talk event is caused by the background noise.

By way of example, but not limitation, QoE measuring device 140 may detect one or more noise sections where the background noise exists around the near-end talker. QoE measuring device 140 may measure the average noise level of the one or more noise sections, compare the average noise level of the one or more noise sections with a predetermined value, and determine that the double talk event is caused by the background noise if the average noise level of the one or more noise sections is higher than the predetermined value.

By way of example, but not limitation, telecommunication terminal 100 may further include a first counter (not shown) configured to count the total number of double talk events during a predetermined time period, and a second counter (not shown) configured to count the number of double talk events caused by the background noise during the predetermined time period.

By way of example, but not limitation, telecommunication terminal 100 may further include a calculator (not shown) configured to calculate the ratio between the output of the first counter and the output of the second counter. The output from the calculator may represent the ratio between the total number of double talk events and the number of double talk events caused by the background noise during a predetermined time period, which may indicate whether the quality degradation is due to the problems of network channel or the background noise. Relatively higher proportion of the number of double talk events caused by the background noise to the total number of double talk events may mean that the quality degradation is largely due to the problems of the background noise, while relatively lower proportion may mean that the quality degradation is largely due to the problems of network channel.

By way of example, but not limitation, telecommunication terminal 100 may further include a memory (not shown). In some embodiments, the memory may store the output of the first counter. In some embodiments, the memory may also store the output of the second counter. In some embodiments, the memory may also store the output of the calculator indicating the ratio between the output of the first counter and the output of the second counter.

Figure 2:
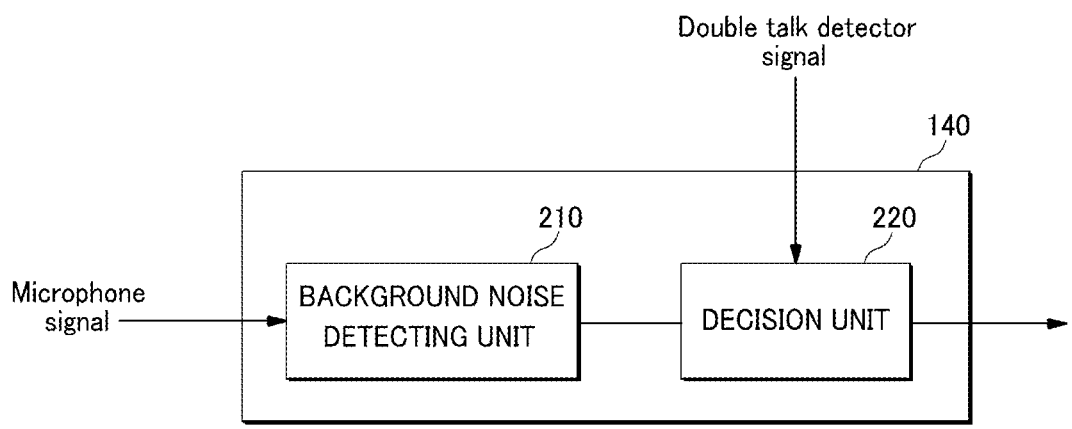
FIG. 2 shows a schematic block diagram of an illustrative example of a QoE measuring device illustrated in FIG. 1.

FIG. 2 shows a schematic block diagram of an illustrative example of QoE measuring device 140 illustrated in FIG. 1. QoE measuring device 140 may include a background noise detecting unit 210 and a decision unit 220.

Referring to FIGS. 1 and 2, by way of example, but not limitation, background noise detecting unit 210 may receive a signal from microphone 120, and measure a background noise around the near-end talker. Decision unit 220 may receive a signal output from background noise detecting unit 210 and a signal output from double talk detector 130 and determine whether a double talk event detected by double talk detector 130 is caused by the background noise.

In some embodiments, background noise detecting unit 210 may include an analogue-to-digital (A/D) converter (not shown) to convert the signal from microphone 120 into a digital signal. In some embodiments, the digital signal in time domain may then be transformed to frequency domain signal. By way of example, but not limitation, the transformation into frequency domain may be carried out using a Fast Fourier Transform (FFT). In frequency domain, the voice signal may be distinguished from the background noise, and the spectrum of the background noise is estimated where there the voice signal does not exist. In some embodiments, the estimated spectrum of the background noise may then be used to measure the level of the background noise.

In some embodiments, background noise detecting unit 210 may measure the average level of the background noise around the near-end talker during a predetermined time interval, and decision unit 220 may compare the average level of the background noise with a predetermined value. In some embodiments, the predetermined time interval for measuring the average level of the background noise may be one frame. In other embodiments, the predetermined time interval for measuring the average level of the background noise may be 20 ms or 160 samples at frequency of 8 kHz. In some embodiments, decision unit 220 may further determine that the double talk event is caused by the background noise, if the average level of the background noise is higher than the predetermined value.

In some embodiments, background noise detecting unit 210 may include a voice activity detector to detect one or more noise sections where the background noise exists around the near-end talker. Background noise detecting unit 210 may further measure the average noise level of the one or more noise sections, and decision unit 220 may further compare the average noise level of the one or more noise sections with a predetermined value. If the average noise level of the one or more noise sections is higher than the predetermined value, decision unit 220 may further determine that the double talk event is caused by the background noise around the near-end talker.

Figure 3:
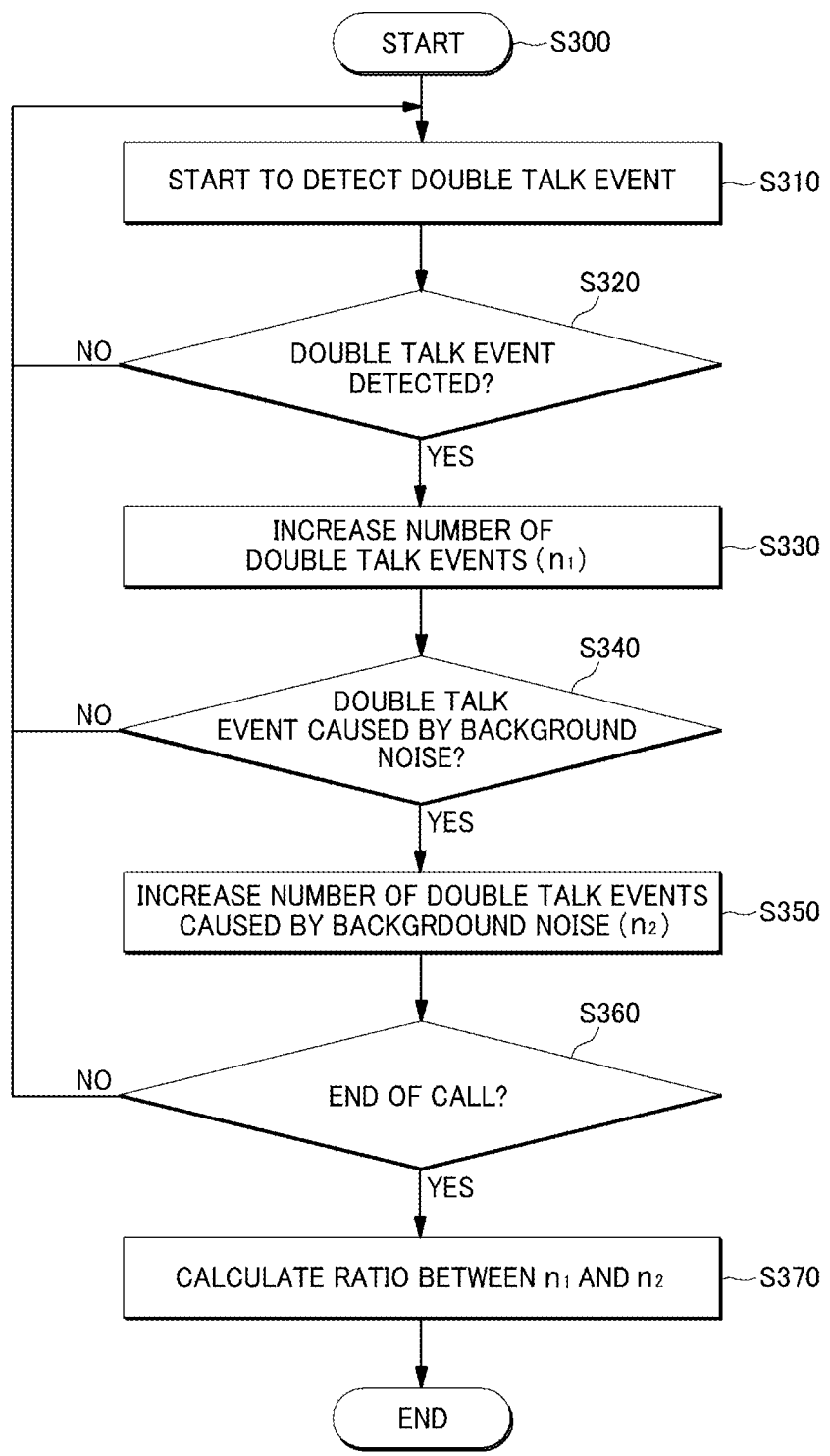
FIG. 3 shows an example flow diagram of a method for measuring a quality of experience (QoE).

FIG. 3 shows a flow diagram of a method for measuring a quality of experience (QoE) in accordance with at least some embodiments described herein. The method in FIG. 3 could be implemented using, for example, the telecommunication terminal including the double talk detector and the QoE measuring device discussed above. An example method may include one or more operations, actions, or functions as illustrated by one or more of blocks S300, S310, S320, S330, S340, S350, S360 and/or S370. Although illustrated as discrete blocks, various blocks may be divided into additional blocks, combined into fewer blocks, or eliminated, depending on the desired implementation.

When a call between a near-end talker and a far-end talker starts (block S300), a telecommunication terminal may start to detect a double talk event between the near-end talker and far-end talker for every frame (block S310). By way of example, but not limitation, a double talk detector in the telecommunication terminal may start to detect a double talk event.

At block S320, the telecommunication terminal may determine whether a double talk event is detected at a certain frame. By way of example, but not limitation, the double talk detector in the telecommunication terminal may determine whether a double talk event is detected at a certain frame.

In some embodiments, if a double talk event between the near-end talker and far-end talker is not detected at a certain frame, the process may continue to block S310 again. In some embodiments, if a double talk event between the near-end talker and far-end talker is detected at a certain frame, a variable indicating the total number of double talk events during a predetermined time ($n_1$) may increase by 1 (block S330).

Then, at block S340, the telecommunication terminal may determine whether the double talk event detected in block S320 is caused by the background noise around the near-end talker. By way of example, but not limitation, a QoE measuring device in the telecommunication terminal may determine whether the double talk is caused by the background noise around the near-end talker. By way of example, but not limitation, the QoE measuring device may compare the average level of the background noise around the near-end talker with a predetermined value, and determine that the double talk event is caused by the background noise around the near-end talker if the average level of the background noise around the near-end talker is higher than the predetermined value.

By way of example, but not limitation, the QoE measuring device may measure the average level of the background noise around the near-end talker during any predetermined time interval. In some embodiments, the predetermined time interval for measuring the average level of the background noise may be one frame. In other embodiments, the predetermined time interval for measuring the average level of the background noise may be 20 ms or 160 samples at frequency of 8 kHz.

In some embodiments, the QoE measuring device may detect one or more noise sections where the background noise exists around the near-end talker, and measure the average noise level of the one or more noise sections. In such embodiments, the QoE measuring device may compare the average noise level of the one or more noise sections with a predetermined value, and determine that the double talk event is caused by the background noise around the near-end talker if the average noise level of the one or more noise sections is higher than the predetermined value.

Referring to FIG. 3 again, if the telecommunication terminal determines that the double talk event is not caused by the background noise around the near-end talker at block S340, the process may continue to block S310 again. In some embodiments, if the telecommunication terminal determines that the double talk event is caused by the background noise around the near-end talker at block S340, a variable indicating the number of double talk events caused by the background noise around the near-end talker during a predetermined time ($n_2$) may increase by 1 (block S350).

Then, at block S360, the telecommunication terminal may determine whether the call between the near-end talker and the far-end talker ends. If the telecommunication terminal determines that the call does not end, the process may continue to block S310 again. If the telecommunication terminal determines that the call ends, the telecommunication terminal may calculate the ratio ($n_2/n_1$) between the total number of double talk events and the number of double talk events caused by the background noise around the near-end talker (block S370). The ratio may indicate whether the quality degradation is due to the problems of network channel or the background noise around the near-end talker. Relatively higher proportion of the number of double talk events caused by the background noise to the total number of double talk events may mean that the quality degradation is largely due to the problems of the background noise, while relatively lower proportion may mean that the quality degradation is largely due to the problems of network channel.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A quality of experience (QoE) measuring device comprising:
   a background noise detecting unit configured to measure a background noise around a near-end talker; and
   a decision unit configured to determine whether an event detected as a double talk event by a double talk detector is caused by background noise around the near-end talker based on the measured background noise as measured by the background noise detecting unit, the decision unit being further configured to determine, based on the determination that the event is caused by the background noise, that a quality degradation associated with a call between the near-end talker and a far-end talker is due to the background noise instead of problems in a network channel over which the call is performed.

2. The QoE measuring device of claim 1, wherein the background noise detecting unit is further configured to measure an average level of the background noise around the near-end talker during a predetermined time interval, and
   wherein the decision unit is further configured to compare the average level of the background noise around the near-end talker with a predetermined value.

3. The QoE measuring device of claim 2, wherein the decision unit is further configured to determine that the event is caused by the background noise around the near-end talker if the average level of the background noise around the near-end talker is higher than the predetermined value.

4. The QoE measuring device of claim 1, wherein the background noise detecting unit is further configured to comprise a voice activity detector, and
   wherein the voice activity detector is configured to detect one or more noise sections where the background noise exists around the near-end talker.

5. The QoE measuring device of claim 4, wherein the background noise detecting unit is further configured to measure an average noise level of the one or more noise sections, and
   wherein the decision unit is further configured to compare the average noise level of the one or more noise sections with a predetermined value.

6. The QoE measuring device of claim 5, wherein the decision unit is further configured to determine that the event is caused by the background noise around the near-end talker if the average noise level of the one or more noise sections is higher than the predetermined value.

7. The QoE measuring device of claim 1, further comprising:
   a counter configured to count a number of events determined as being caused by the background noise around the near-end talker, the decision unit being configured to determine that the quality degradation associated with the call is due to the background noise instead of problems in the network channel based on an output of the counter.

8. The QoE measuring device of claim 1, further comprising:
   a first counter configured to count a total number of events during a predetermined time period, and
   a second counter configured to count a number of events determined as being caused by the background noise around the near-end talker during the predetermined time period, the decision unit being configured to determine that the quality degradation associated with the call is due to the background noise instead of problems in the network channel based on an output of the first counter and an output of the second counter.

9. The QoE measuring device of claim 8, further comprising:
   a calculator configured to calculate a ratio between the output of the first counter and the output of the second counter, the decision unit being configured to determine that the quality degradation associated with the call is due to the background noise instead of problems in the network channel based on the ratio.

10. A telecommunication terminal comprising:
    a double talk detector configured to detect, as a double talk event, an event between the telecommunication terminal and another party of a call;
    a background noise detecting unit configured to measure a background noise around the telecommunication terminal; and
    a decision unit configured to determine whether the event detected by the double talk detector is caused by background noise around the telecommunication terminal based on the measured background noise as measured by the background noise detecting unit, the decision unit being further configured to determine, based on the determination that the event is caused by the background noise, that a quality degradation associated with the call is due to the background noise instead of problems in a network channel over which the call is performed.

11. The telecommunication terminal of claim 10, wherein the background noise detecting unit is further configured to measure an average level of the background noise around the telecommunication terminal during a predetermined time interval, and
    wherein the decision unit is further configured to compare the average level of the background noise around the telecommunication terminal with a predetermined value.

12. The telecommunication terminal of claim 11, wherein the decision unit is further configured to determine that the event is caused by the background noise around the telecommunication terminal if the average level of the background noise around the telecommunication terminal is higher than the predetermined value.

13. The telecommunication terminal of claim 10, wherein the background noise detecting unit is further configured to comprise a voice activity detector, and
    wherein the voice activity detector is configured to detect one or more noise sections where the background noise exists around the telecommunication terminal.

14. The telecommunication terminal of claim 13, wherein the background noise detecting unit is further configured to measure an average noise level of the one or more noise sections, and
    wherein the decision unit is further configured to compare the average noise level of the one or more noise sections with a predetermined value.

15. The telecommunication terminal of claim 14, wherein the decision unit is further configured to determine that the event is caused by the background noise around the telecommunication terminal if the average noise level of the one or more noise sections is higher than the predetermined value.

16. The telecommunication terminal of claim 10, further comprising:
    a counter configured to count a number of events determined as being caused by the background noise around the telecommunication terminal, the decision unit being configured to determine that the quality degradation associated with the call is due to the background noise instead of problems in the network channel based on an output of the counter.

17. The telecommunication terminal of claim 10, further comprising:
    a first counter configured to count a total number of events during a predetermined time period, and
    a second counter configured to count a number of events determined as being caused by the background noise around the telecommunication terminal during the predetermined time period, the decision unit being configured to determine that the quality degradation associated with the call is due to the background noise instead of problems in the network channel based on an output of the first counter and an output of the second counter.

18. The telecommunication terminal of claim 17, further comprising:
    a calculator configured to calculate a ratio between the output of the first counter and the output of the second counter, the decision unit being configured to determine that the quality degradation associated with the call is due to the background noise instead of problems in the network channel based on the ratio.

19. A method performed under control of a quality of experience (QoE) measuring device, the method comprising:
    measuring a background noise around a near-end talker;
    determining whether an event detected as a double talk event between the near-end talker and a far-end talker is caused by background noise around the near-end talker based on the measured background noise; and
    determining, based on the determination that the event is caused by the background noise, that a quality degradation associated with a call between the near-end talker and the far-end talker is due to the background noise instead of problems in a network channel over which the call is performed.

20. The method of claim 19, wherein the measuring further comprises measuring an average level of the background noise around the near-end talker during a predetermined time interval, and
    the determining further comprises comparing the average level of the background noise around the near-end talker with a predetermined value.

21. The method of claim 20, wherein the determining further comprises determining that the event is caused by the background noise around the near-end talker if the average level of the background noise around the near-end talker is higher than the predetermined value.

22. The method of claim 19, wherein the measuring further comprises detecting one or more noise sections where the background noise exists around the near-end talker.

23. The method of claim 22, wherein the measuring further comprises measuring an average noise level of the one or more noise sections, and
    the determining further comprises comparing the average noise level of the one or more noise sections with a predetermined value.

24. The method of claim 23, wherein the determining further comprises determining that the event is caused by the background noise around the near-end talker if the average noise level of the one or more noise sections is higher than the predetermined value.

25. The method of claim 19, further comprising:
    counting a number of events determined as being caused by the background noise around the near-end talker; and
    determining that the quality degradation associated with the call is due to the background noise instead of problems in the network channel based on the number of events determined as being caused by the background noise.

26. The method of claim 19, further comprising:
    counting a total number of events during a predetermined time period;
    counting a number of events determined as being caused by the background noise around the near-end talker during the predetermined time period; and
    calculating a ratio between the total number of events and the number of events determined as being caused by the background noise around the near-end talker; and
    determining that the quality degradation associated with the call is due to the background noise instead of problems in the network channel based on the ratio.

27. A non-transitory computer-readable storage medium whose contents, when executed by a processor, cause the processor to:
    measure a background noise around a near-end talker; and
    determine whether an event detected as a double talk event between the near-end talker and a far-end talker is caused by background noise around the near-end talker based on the measured background noise; and
    determine, based on the determination that the event is caused by the background noise, that a quality degradation associated with a call between the near-end talker and the far-end talker is due to the background noise instead of problems in a network channel over which the call is performed.

* * * * *